(12) United States Patent
Bera

(10) Patent No.: US 7,836,112 B2
(45) Date of Patent: *Nov. 16, 2010

(54) DETERMINING THE EQUIVALENCE OF TWO SETS OF SIMULTANEOUS LINEAR ALGEBRAIC EQUATIONS

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1450 days.

This patent is subject to a terminal disclaimer.

(21) Appl. No.: 11/231,091

(22) Filed: Sep. 20, 2005

(65) Prior Publication Data

US 2006/0015550 A1 Jan. 19, 2006

Related U.S. Application Data

(62) Division of application No. 09/597,478, filed on Jun. 20, 2000, now Pat. No. 7,043,510.

(51) Int. Cl.
G06F 15/00 (2006.01)
G06F 13/00 (2006.01)
(52) U.S. Cl. ...................... 708/200; 708/160
(58) Field of Classification Search ......... 708/200–209, 708/490, 495, 523, 160
See application file for complete search history.

(56) References Cited

U.S. PATENT DOCUMENTS 5,200,915 A * 4/1993 Hayami et al. ............... 708/520
5,343,554 A * 8/1994 Koza et al. ................... 706/13
5,392,429 A * 2/1995 Agrawal et al. ............. 708/446
6,601,080 B1 * 7/2003 Garg ........................... 708/502
2002/0007385 A1 * 1/2002 Stoutemyer ................. 708/200

OTHER PUBLICATIONS

Anthony Ralston, "A First Course in Numerical Analysis", 1965, McGraw-Hill Inc, pp. 394-463.*

* cited by examiner

*Primary Examiner*—Chat C Do
(74) *Attorney, Agent, or Firm*—Anthony V S England; William Steinberg

(57) ABSTRACT

A computer implemented method (200) is described for determining the equivalence of two sets of simultaneous linear algebraic equations. Each of said equations is of a form:

$$e_{i1}x_1 + e_{i2}x_2 + e_{i3}x_3 + \ldots + e_{in}x_n = b_i$$

wherein $x_j$ are unknowns, $e_{ij}$ are coefficients and $b_i$ are quantities, and defining the relationship between the unknowns within the set. The coefficients and quantities are known algebraic expressions. The unknowns are iteratively eliminated (250 to 280) from each of the sets of simultaneous linear algebraic equations until each of said equations are in the form:

$$(l_{ii})_k x_i = (r_i)_k$$

wherein $l_{ii}$ and $r_i$ are algebraic expressions, and k={1;2} indicate one of said sets that said equation is derived from. The products $(l_{ii})_1 * (r_i)_2$ and $(l_{ii})_2 * (r_i)_1$ are compared (300) for each of the unknowns. Only if the products match (310) for all the unknowns are the two sets of simultaneous linear algebraic equations equivalent (312). An apparatus (100) for performing the above method (200) is also provided.

20 Claims, 3 Drawing Sheets

DETERMINING THE EQUIVALENCE OF TWO SETS OF SIMULTANEOUS LINEAR ALGEBRAIC EQUATIONS

CROSS-REFERENCE TO RELATED APPLICATION

This application is a divisional of prior application Ser. No. 09/597,478, which was originally filed on Jun. 20, 2000 now U.S. Pat. No. 7,043,510.

TECHNICAL FIELD OF THE INVENTION

The present invention relates to a computer implementable method, and in particular, to a method and apparatus for determining whether two sets of simultaneous linear algebraic equations are equivalent.

BACKGROUND ART

In many applications, the need arises to solve one or more systems of simultaneous linear algebraic equations (SLAEs) whose coefficient matrices comprise only numerical elements. Such applications include engineering and simulation computer codes. Solutions of the SLAE are typically obtained by using the well-known Gaussian elimination method. Therefore, prior methods typically would solve two such SLAE systems $S_1$ and $S_2$, and compare their solutions. However, such methods may not always work if one or both of the SLAEs are ill-conditioned and/or the numerical precision used in computations is not high enough.

Furthermore, such methods are generally not adapted to solving a set of SLAEs whose coefficient matrix elements are algebraic expressions, and for which the solution will, in general, be in algebraic form.

DISCLOSURE OF THE INVENTION

It is an object of the present invention to provide a method of determining whether two sets of simultaneous linear algebraic equations are equivalent.

The invention provides a computer implemented method for determining the equivalence of two sets of simultaneous linear algebraic equations (SLAEs), each of the sets comprising two or more algebraic equations. The method comprising the steps of:

reducing each SLAE to a standard form; and comparing the SLAEs to determine whether equivalence exists.

The invention further provides a computer implemented method of determining the equivalence of a first and a second set of simultaneous linear algebraic equations (SLAEs), with the method comprising the steps of:

iteratively eliminating unknowns from each of the sets of SLAEs to place each SLAE in a two-part standard form; and forming a product of a part of one standard form equation with a part of another part of another standard form equation;

forming a product of the other part of standard form equation with the other part of another standard form equation; and comparing the respective products for mathematical equivalence.

There is further provided a computer implemented method of determining the equivalence of a first and a second set of simultaneous linear algebraic equations, each of the equations being of a form:

$$1e_{i1}x_1+e_{i2}x_2+e_{i3}x_3+\ldots+e_{in}x_n=b_i$$

wherein $x_j$ are unknowns, $e_{ij}$ are coefficients, and $b_i$ are quantities. The coefficients and quantities are known algebraic expressions. The method comprising the steps of:

iteratively eliminating the unknowns from each of the sets of simultaneous linear algebraic equations until each of the equations are in the form:

$$(l_{ii})_k x_i = (r_i)_k$$

wherein $l_{ii}$ and $r_i$ are algebraic expressions, and k={1;2} indicate one of the sets that the equation is derived from; and comparing, for each of the unknowns, the products $(l_{ii})_1 * (r_i)_2$ and $(l_{ii})_2 * (r_i)_1$, wherein the first and the second set of simultaneous linear algebraic equations are equivalent if the products match for all the unknowns.

The invention further discloses a computational apparatus for determining the equivalence of a first and a second set of simultaneous linear algebraic equations, each of the equations being in the form:

$$e_{i1}x_1+e_{i2}x_2+e_{i3}x_3+\ldots+e_{in}x_n=b_i$$

wherein $x_j$ are unknowns, $e_{ij}$ are coefficients, and $b_i$ are quantities, the coefficients and quantities being known algebraic expressions. The apparatus comprising:

means for iteratively eliminating the unknowns from each of the sets of simultaneous linear algebraic equations until each of the equations are in the form:

$$(l_{ii})_k x_i = (r_i)_k$$

wherein $l_{ii}$ and $r_i$ are algebraic expressions, and k={1;2} indicate one of the sets that the equation is derived from; and means for comparing, for each of the unknowns, the products $(l_{ii})_1 * (r_i)_2$ and $(l_{ii})_2 * (r_i)_1$, wherein the first and the second set of simultaneous linear algebraic equations are equivalent if the products match for all the unknowns.

The invention yet further discloses a computer program product carried by a storage medium for determining the equivalence of a first and a second set of simultaneous linear algebraic equations, each of the equations being of a form:

$$e_{i1}x_1+e_{i2}x_2+e_{i3}x_3+\ldots+e_{in}x_n=b_i$$

wherein $x_j$ are unknowns, $e_{ij}$ are coefficients, and $b_i$ are quantities, the coefficients and quantities being known algebraic expressions. The computer program product comprising:

a program element for iteratively eliminating the unknowns from each of the sets of simultaneous linear algebraic equations until each of the equations are in the form:

$$(l_{ii})_k x_i = (r_i)_k$$

wherein $l_{ii}$ and $r_i$ are algebraic expressions, and k={1;2} indicate one of the sets that the equation is derived from; and a program element for comparing, for each of the unknowns, the products $(l_{ii})_1 * (r_i)_2$ and $(l_{ii})_2 * (r_i)_1$, wherein the first and the second set of simultaneous linear algebraic equations are equivalent if the products match for all the unknowns.

Preferably, the method further includes recasting the algebraic expressions into a form of one or more token pairs arranged sequentially in a string, each of the token pair comprising an operator followed by an operand; and reducing the strings in accordance with a set of predetermined simplifying rules to obtain reduced expressions. Eliminating the unknowns from each of the sets of simultaneous linear algebraic equations is performed on the reduced strings in accordance with a set of predetermined operations.

Furthermore, the simplifying rules can comprise the steps of arranging token pairs into subgroups, arranging operand tokens in an arranged subgroup in order, reducing the ordered operands by consolidating one or more constants and eliminating variables of opposite effect to form reduced subgroups, and consolidating one or more multiple instances of similar subgroups, to produce a reduced string.

BRIEF DESCRIPTION OF THE DRAWINGS

A preferred embodiment of the present invention will now be described with reference to the drawings in which.

DETAILED DESCRIPTION INCLUDING BEST MODE

Apparatus

Figure 1:
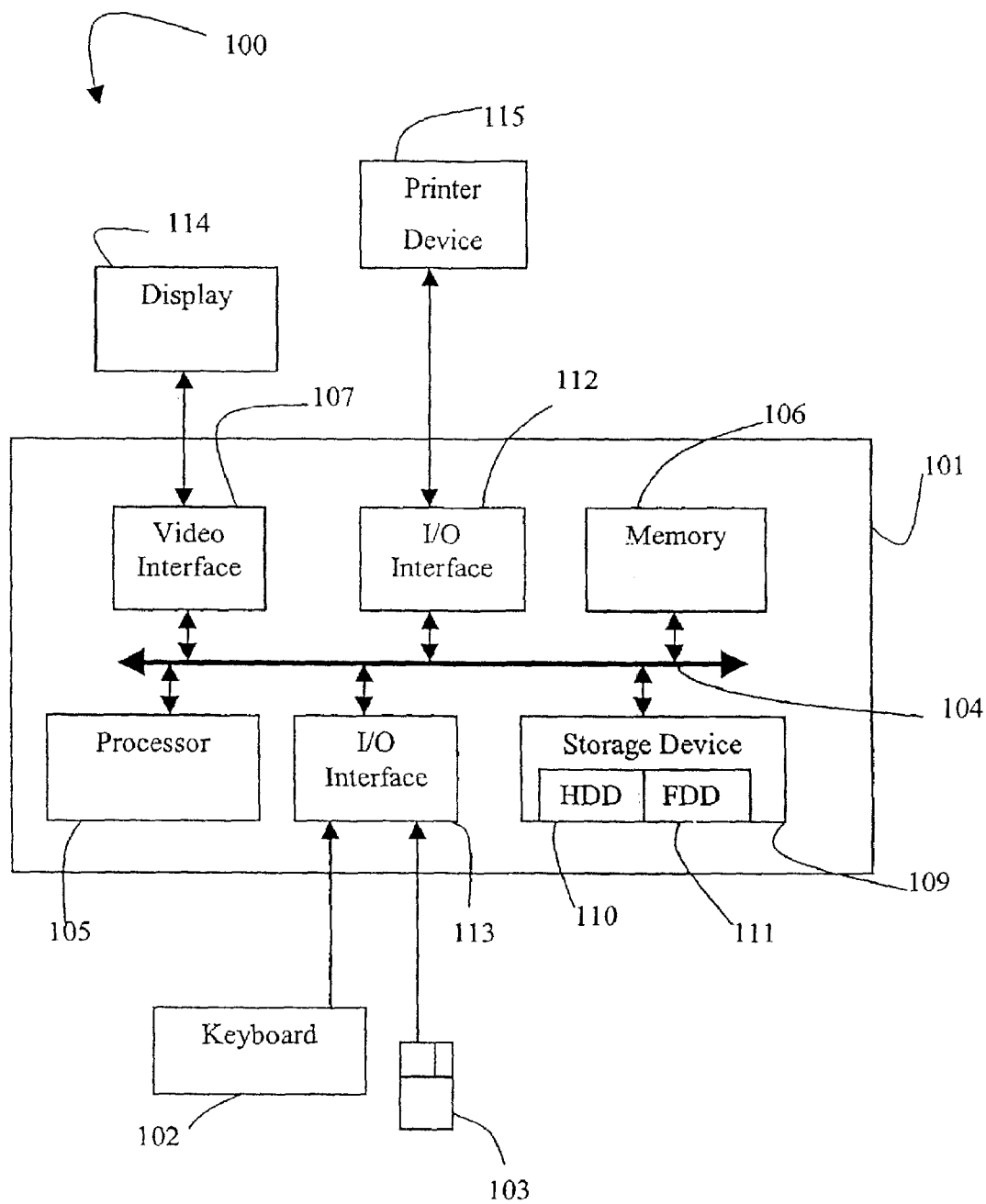
FIG. 1 is a schematic block diagram of a conventional general-purpose computer system upon which the embodiment of the invention may be practised.

A general-purpose computer system 100, upon which the preferred embodiment of the invention may be practised, is shown in FIG. 1. The computer system 100 will first be described, followed more particularly by a description of a method of determining whether two sets of simultaneous linear algebraic equations are equivalent.

This method may be implemented as software, such as an application program executing within the computer system 100. In particular, the steps of the method of determining whether two sets of simultaneous linear algebraic equations are equivalent, are effected by instructions in the software that are carried out by the computer system 100. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer preferably effects an advantageous apparatus for determining whether two sets of simultaneous linear algebraic equations are equivalent, in accordance with the embodiments of the invention.

The computer system 100 comprises a computer module 101, input devices such as a keyboard 102 and mouse 103, and output devices including a printer 115 and a display device 114. The computer module 101 typically includes at least one processor unit 105, a memory unit 106, for example formed from semiconductor random access memory (RAM) and read only memory (ROM), input/output (I/O) interfaces including a video interface 107, an I/O interface for the printer device 115 and an I/O interface 113 for the keyboard 102 and mouse 103. A storage device 109 is provided and typically includes a hard disk drive 110 and a floppy disk drive 111. A CD-ROM drive (not illustrated) may be provided as a non-volatile source of data. The components 105 to 113 of the computer module 101, typically communicate via an interconnected bus 104 and in a manner which results in a conventional mode of operation of the computer system 100 known to those in the relevant art.

Typically, the application program of the preferred embodiment is resident on the hard disk drive 110, and read and controlled in its execution by the processor 105. Intermediate storage of the program may be accomplished using the semiconductor memory 106, possibly in concert with the hard disk drive 110. In some instances, the application program may be supplied to the user encoded on a CD-ROM or floppy disk and read via a CD-ROM drive (not illustrated) or floppy disk drive 111, or alternatively in a case where the program is stored on tangible media connected to the network, may be read by the user from the tangible media on the network (not illustrated) via transmission by the modem device (not illustrated) or via transmission by a radio or infra-red transmission channel. The transmission may also include e-mail transmission. Still further, the software can also be loaded into the computer system 100 from other computer readable medium including magnetic tape, a ROM or integrated circuit, a magneto-optical disk, or a computer readable card such as a PCMCIA card, The foregoing is merely exemplary of relevant computer readable mediums. Other computer readable mediums may be practiced without departing from the scope and spirit of the invention.

Having described the hardware environment of the invention, the method of determining whether two sets of simultaneous linear algebraic equations are equivalent will now be described.

Broad Outline of Method

Let S represent a system of simultaneous linear algebraic equations (SLAEs) as is given by the following:

$$e_{11}x_1+e_{12}x_2+e_{13}x_3+\ldots+e_{1n}x_n=b_1$$

$$e_{21}x_1+e_{22}x_2+e_{23}x_3+\ldots+e_{2n}x_n=b_2$$

$$\ldots$$

$$e_{n1}x_1+e_{n2}x_2+e_{n3}x_3+\ldots+e_{nn}x_n=b_n$$

where n-unknowns $\{x_1,x_2,x_3,\ldots,x_n\}$ are related by n equations, and coefficients $e_{ij}$ (with $i=1,2,\ldots,n$ and $j=1,2,\ldots,n$) are known algebraic expressions, as are the right-hand side quantities $b_i$, $i=1,2,\ldots,n$.

The method of determining whether two such systems $S_1$ and $S_2$ are equivalent—that is, their respective solutions are identical to each other—broadly has two parts, namely:

(1) the reduction of each system of SLAEs S into a standard form of the type $$l_{11}x_1=r_1$$

$$l_{22}x_2=r_2$$

$$l_{33}x_3=r_3$$

$$\ldots$$

$$l_{nn}x_n=r_n$$

where $l_{ii}$ and $r_i$ are algebraic expressions; and (2) comparison of two sets of SLAEs in their standard form.

It is assumed that the coefficients $e_{ij}$ and the quantities $b_i$ of the SLAEs $S_1$ and $S_2$ have no division operators. Undesirable division operators can be eliminated from the SLAEs $S_1$ and $S_2$ by multiplying the affected equations by appropriate factors. This is done to reduce the complexity of handling operands associated with the division operator, which is not a commutative operator.

Reduced Expression

The may be written as expressions, wherein the terms in the may include constants and variables. In the preferred embodiment, to facilitate comparisons between two expressions, the concept of a reduced form of an expression, as described below, has been used. The reduced expression is the canonical form to which expressions are converted.

It is apriori assumed that the expression to be converted is syntactically correct and does not contain any blanks. In the preferred embodiment, variables are limited in their construction to lower-case alphabets, underscore character, and digits, except that a variable may not start with a digit or end with an underscore. If these construction rules are not met, then the affected variables may be mapped (aliased) to alternative, but distinct, variables obeying the construction rules, and these new variables used instead.

Figure 2A:
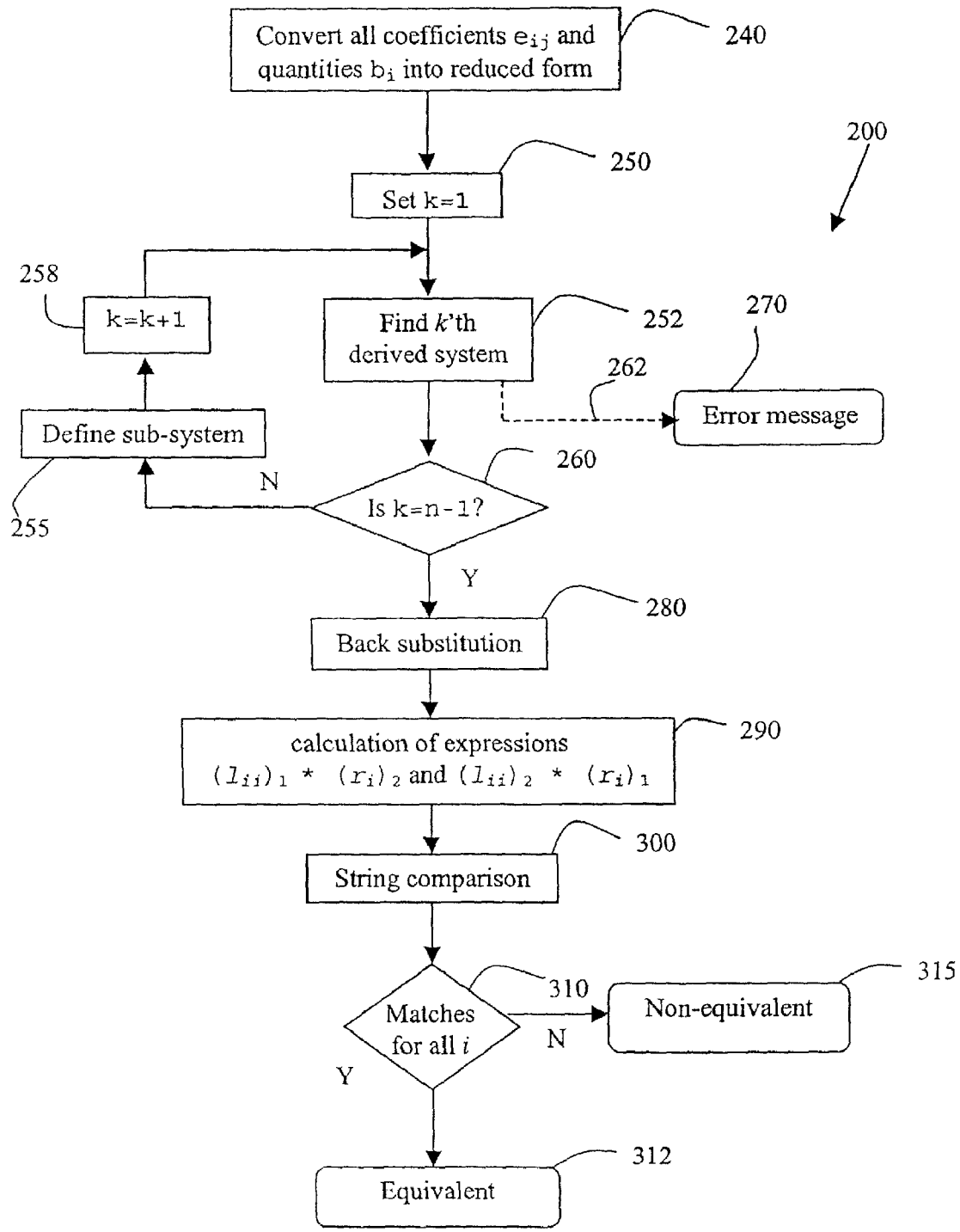
FIG. 2A is a flow diagram of a method of determining whether two sets of simultaneous linear algebraic equations are equivalent.
Figure 2B:
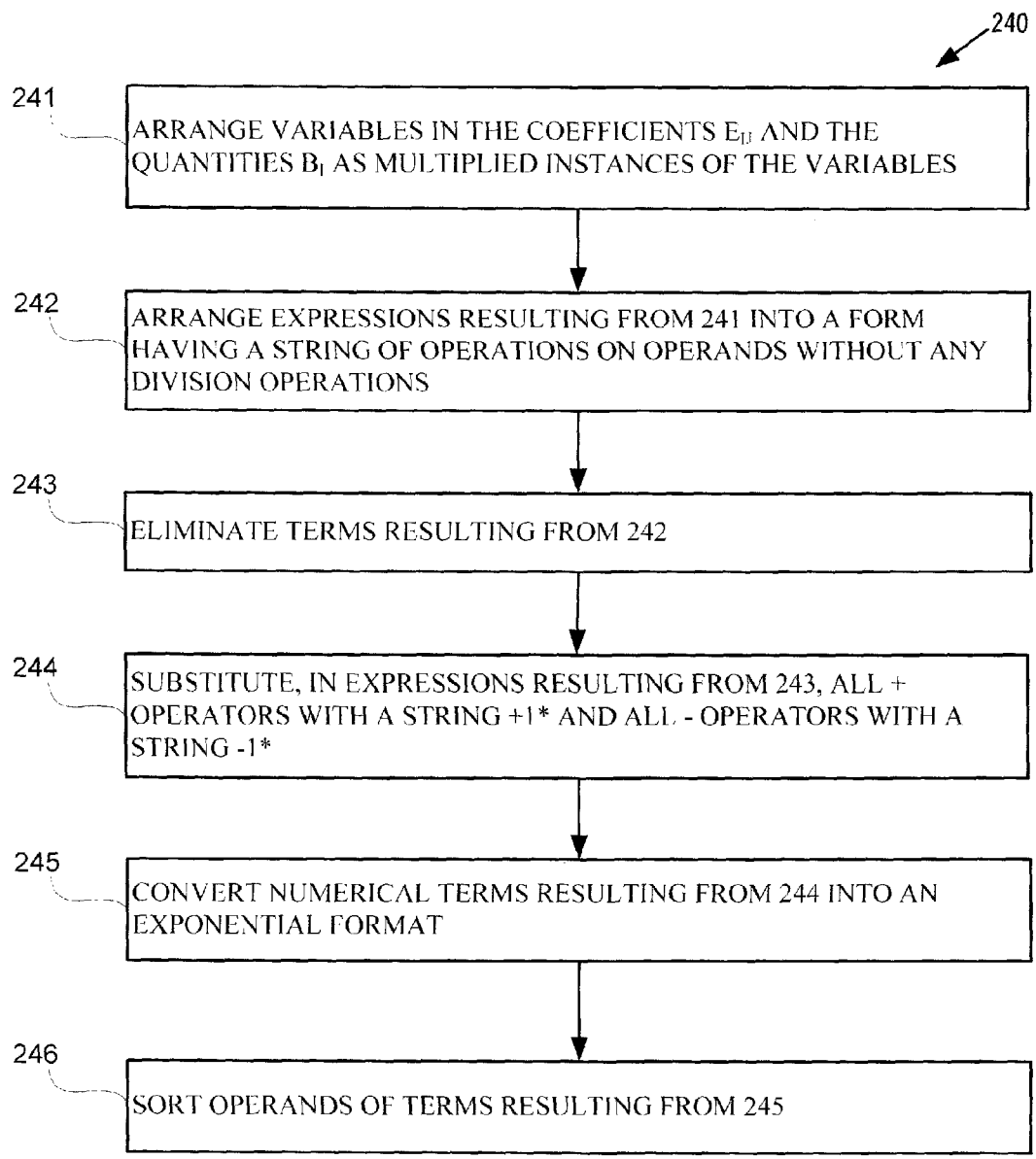
FIG. 2B is a flow diagram of a method of converting all coefficents $3_{ii}$ and quantities $b_i$ into reduced form.

Referring now to FIG. 2B, a method for reduction of SLAEs is described in more detail. At 241 a convention adopted for the present embodiment is that variables in the coefficients $e_{ij}$ and the quantities $b_i$ raised to a positive integer power are written out as multiplications of the variables. Thus, for example:

$a^n$ becomes $a*a* \ldots *a$, where a appears n times in the product.

To convert a given expression into a reduced expression, at 242 the expression firstly is put in the following form:

<unitary operator><operand><operator><operand> . . . <operator><operand> where the unitary operator is either + (plus) or − (minus), and each operator is one of + (plus), − (minus), or *(multiplication). In the event that an expression does not commence with a unitary operator, a unitary operator + (plus) is inserted at the start of the expression. For example:

a+b*c−d becomes +a+b*c−d

Note, at 243 in particular, the absence of brackets. Brackets, if present in the expression, must be removed by carrying out the necessary operations needed to remove them, such as multiplying two parenthesized factors, discarding superfluous brackets, etc. to bring a given expression into the above form.

Next, at 244 all + (plus) operators are substituted with the string +1* so that + becomes +1*. Similarly, all − (minus) operators are substituted with the string −1* so that − becomes −1*. Thus, for example:

+ a becomes +1*a and

−a*b becomes −1*a*b

Finally, at 245 the operands, which are constants (including the 1s introduced in the previous step) are converted into an e-format as follows:

".[unsigned number]e[e-sign][unsigned exponent]"

where: [unsigned number] is a n-digited number comprising only digits and n is a prefixed integer greater than 0;
  [e-sign] is the sign of the exponent and is one of > for plus or < for minus; and
  [unsigned exponent] is a m-digited number comprising only digits and m is a prefixed integer greater than 0.

Thus, for example:

$25=0.25*10^2$ becomes 0.250000e>02 and $0.025=0.25*10^{-1}$ becomes 0.250000e<01 where it is assumed n=6 and m=2. It is noted that any constant will be represented by a string of constant length m+n+3 characters in the e-format. Here e[e-sign][unsigned exponent] represents the quantity 10 raised to the power [e-sign][unsigned exponent], which must be multiplied to the number represented by .[unsigned number] to get the actual constant.

Now, the expression will contain at least one operand which is a constant. Each expression will have one or more terms, where each term has the following form:

<unitary operator><operand><*><operand> . . . <*><operand> where the unitary operator is either + (plus) or − (minus), and between two consecutive operands is the multiplication operator *. After the terms are identified, the [e-sign] of each constant is restored from < or > to or + respectively.

At 246, in each term the operands are sorted (rearranged) in ascending order according to their ASCII (American Standard Code for Information Interchange) value. This does not affect the term since the multiplication operator is a commutative operator, so the exchange of operands is completely permissible. The operands, which are constants, will all bunch up at the beginning of the terms where they can be easily identified and replaced by a single constant. Thus, for example:

+0.100000e+01*a*b*0.500000e+00 is after arranging the operands in ascending order becomes

+0.100000e+01*0.500000e+00*a*b and after consolidating the constants the term becomes +0.500000e+00*a*b At this stage a term will have the following form:

<unitary operator><constant><*><operand> . . . <*><operand> where each operand is a variable, whose ASCII value is not lower than that of its preceding operand, if any. This is the reduced form of a term. In the reduced form, the non-constant part of a term is called a variable-group. For example, if the term in the reduced form is "+0.250000e+01*a*a*b", then its variable-group is "*a*a*b".

In an expression, all those terms whose variable-groups match, are combined by modifying the constant in one of the terms, and eliminating all other terms with identical variable-group.

Finally, the reduced terms in the expression are rearranged in an ascending order according to the ASCII value of their respective variable-group. In this final form, the expression is said to be in its reduced form. Note, in particular, that no two terms in a reduced expression will have the same variable-group.

Method of Determining Equivalence

Referring to FIG. 2, a method 200 of determining whether two such systems $S_1$ and $S_2$ are equivalent is shown. Starting in step 240, all the coefficients $e_{ij}$ and the quantities $b_i$ are converted into their respective reduced form (as discussed above).

In steps 250 to 280, the Gaussian elimination and back substitution method (adapted to avoid divisions) is used to bring the SLAEs $S_1$ and $S_2$ into a standard form.

In step 250 a counter k is set to 1. Step 252 follows, where the variable $x_k$ is eliminated from the j-th equations, j=(k+1), ... ,n, to get a kth derived system. In particular, with counter k equal to 1, the variable $x_1$ is eliminated from the j-th equations, j=2,3, ... ,n, to get a first derived system defined as:

$$e_{11}x_1 + e_{12}x_2 + e_{13}x_3 + \ldots + e_{1n}x_n = b_1$$

$$^1e_{22}x_2 + ^1e_{23}x_3 + \ldots + ^1e_{2n}x_n = ^1b_2$$

$$\ldots$$

$$^1e_{n2}x_2 + ^1e_{n3}x_3 + \ldots + ^1e_{nn}x_n = ^1b_n$$

where the new coefficients $^1e_{jk}$ of the first derived system are given by:

$$^1e_{jk} = e_{jk}e_{11} - e_{1k}e_{j1}; \text{ and}$$

$$^1b_j = b_j e_{11} - b_1 e_{j1}, \text{ for } (j,k) = 2, \ldots, n.$$

In a case where the coefficient $e_{11} = 0$, then the first equation of the system S is interchanged with any other equation m of the system S for which its coefficient $e_{lm}$ is non-zero. If no such equation m can be found, then the SLAEs are singular, and the method 200, and in particular step 252, is interrupted by following the line 262 to step 270, where the method 200 is terminated with an appropriate error message.

In step 260 it is determined whether the counter k is equal to n−1, where n is the number of unknowns. If this is not so, a sub-system is defined in step 255 from the kth derived system. For example, with counter k equal to 1, the sub-system derived from the first derived system is as follows:

$$^1e_{22}x_2 + ^1e_{23}x_3 + \ldots + ^1e_{2n}x_n = ^1b_2$$

$$\ldots$$

$$^1e_{n2}x^2 + ^1e_{n3}x_3 + \ldots + ^1e_{nn}x_n = ^1b_n$$

This sub-system is a set of (n−1) SLAEs, having (n−1) unknowns $\{x_2, x_3, \ldots, x_n\}$. After incrementing the counter k in step 258, the steps of reduction 252 to 260 are now repeated on the sub-systems, until the system S is reduced to a (n−1)-th derived system as follows:

$$e_{11}x_1 + e_{12}x_2 + e_{13}x_3 + \ldots + e_{1n}x_n = b_1$$

$$^1e_{22}x_2 + ^1e_{23}x_3 + ^1e_{2n}x_n = ^1b_2$$

$$\ldots$$

$$^{n-1}e_{nn}x_n = ^{n-1}b_n$$

wherein the diagonal coefficients $^{j-1}e_{jj}$, j=1, ... ,n, are all nonzero, and where $$^1e_{jk} = {}^{l-1}e_{jk} {}^{l-1}e_{ll} - {}^{l-1}e_{lk} {}^{l-1}e_{jl},$$

$$^1b_j = {}^{l-1}b_j {}^{l-1}e_{ll} - {}^{l-1}b_l {}^{l-1}e_{jl}, \text{ for } l=1,\ldots,n1; (j,k)=l+1,\ldots,n,$$

and $$^0e_{jk} = e_{jk}.$$

This completes the Gaussian elimination phase of the process. Note the absence of any division in the entire process. The counter k is now equal to n−1 and the method therefore continues to step 280 where back substitution is performed, again without any division. Therefore, instead of calculating the unknown $x_i$, the product $l_{ii} x_i$ is calculated, where each of the n unknowns $x_i$ is expressed in the form of a ratio $x_i = r_i / l_{ii}$ with $r_i$ a numerator and $l_{ii}$ a denominator. With i=n, we have, $$^{n-1}e_{nn}x_n = ^{n-1}b_n$$

so that $$l_{nn} = {}^{n-1}e_{nn} \text{ and } r_n = {}^{n-1}b_n.$$

For i=n−1, the (n−1)-th equation is multiplied by the denominator $l_{nn}$ to obtain $$l_{nn}{}^{n-2}e_{n-1,n-1}x_{n-1} + l_{nn}{}^{n-2}e_{n-1,n}x_n = {}^{n-2}b_{n-1}l_{nn}$$

or $$l_{nn}{}^{n-2}e_{n-1,n-1}x_{n-1} = {}^{n-2}b_{n-1}l_{nn} - {}^{n-2}e_{n-1,n}r_n$$

so that $$l_{n-1,n-1} = l_{nn}{}^{n-2}e_{n-1,n-1} \text{ and } r_{n-1} = {}^{n-2}b_{n-1}l_{nn} - {}^{n-2}e_{n-1,n}r_n.$$

For i=n−2, we multiply the (n−2)-th equation by the denominator $l_{n-1,n-1}$ and obtain $$l_{n-1,n-1}{}^{n-3}e_{n-2,n-2}x_{n-2} + l_{n-1,n-1}{}^{n-3}e_{n-2,n-1}x_{n-1} + l_{n-1,n-1}{}^{n-3}e_{n-2,n}x_n = {}^{n-3}b_{n-2}l_{n-1,n-1}$$

or $$l_{n-1,n-1}{}^{n-3}e_{n-2,n-2}x_{n-2} = {}^{n-3}b_{n-2}l_{n-1,n-1} - {}^{n-2}e_{n-1,n-1}{}^{n-3}e_{n-2,n}r_n - {}^{n-3}e_{n-2,n-1}r_{n-1}$$

so that $$l_{n-2,n-2} = l_{n-1,n-1}{}^{n-3}e_{n-2,n-2} \text{ and } r_{n-2} = {}^{n-3}b_{n-2}l_{n-1,n-1} - {}^{n-2}e_{n-1,n-1}{}^{n-3}e_{n-2,n}r_n - {}^{n-3}e_{n-2,n-1}r_{n-1}$$

It can be shown that for any i=1,2, ... ,n−1, the result will be $$l_{ii} = l_{i+1,i+1}{}^{i-1}e_{ii} \text{ and } r_i = {}^{i-1}b_i l_{i+1,i+1} - R_{in}r_n - R_{i,n-1}r_{n-1} - \ldots - R_{i,i+1}r_{i+1}$$

with $$l_{nn} = {}^{n-1}e_{nn} \text{ and } r_n = {}^{n-1}b_n$$

where $$R_{ij} = (l_{i+1,i+1}/l_{jj})^{i-1}e_{ij} \text{ for } j=n, \ldots, (i+1) \text{ and } i=1, 2, \ldots, n-1.$$

Note that since $l_{jj}$ is a factor of $l_{i+1,i+1}$, $R_{ij}$ will be free of any divisions. However, it is noted that there is no step in the back substitution step 280 where factors common to $l_{ii}$ and $r_i$ have been eliminated.

After completing steps 240 to 280 for each of the two SLAEs systems $S_1$ and $S_2$, string arrays $(l_{ii})_1$ and $(r_i)_1$ for system $S_1$ and $(l_{ii})_2$ and $(r_i)_2$ for system $S_2$ have been produced. In principle, to show that the solutions of the two systems $S_1$ and $S_2$ are equivalent, it would suffice if their respective string arrays $l_{ii}$ and $r_i$ where shown to match. However, this can not always be done, since it is generally not possible to eliminate their common factors completely by presently known methods. It must therefore be assumed that there may be uneliminated common factors present. However, it is clear that mathematically $$(l_{ii}/r_i)_1 = (l_{ii}/r_i)_2$$

or equivalently, $$(l_{ii})_1 * (r_i)_2 = (l_{ii})_2 * (r_i)_1$$

in which form a comparison may be performed. Therefore, step 290 calculates expressions $(l_{ii})_1 * (r_i)_2$ and $(l_{ii})_2 * (r_i)_1$ for each i=1, ..., n. If all the expressions $(l_{ii})_1*(r_i)_2$ and $(l_{ii})_2*(r_i)_1$ have been consistently reduced to their reduced form, then a step 300 performs a simple string comparison of $(l_{ii})_1*(r_i)_2$ with $(l_{ii})_2*(r_i)_1$. A decision step 310 determines whether matches were found for all i=1, ..., n. If the answer is Yes, then equivalence of systems $S_1$ and $S_2$ is reported in step 312. Alternatively, non-equivalence is reported in step 315.

EXAMPLE

An example of performing the method 200 to determine whether two systems $S_1$ and $S_2$ are equivalent, will now be described. C and C++ programing language notations will be used. In this notation, the are denoted as e[i−1][j−1] and b[i−1] respectively.

To understand the example given below, reference to the following pseudo-code fragment will be helpful. The variables e [ ] [ ] and b [ ] are assumed to have the datatype algebraic expression, which inter alia will implement the operators +(plus), −(minus), and *(multiplication) operators on such expressions. The class expression also has a method which can convert an algebraic expression into its reduced form.

```
// Gaussian elimination
// e[ ][ ] and b[ ] are of type Expression.
for (i = 0; i < n−1; i++) { // Index for the derived system.
   // --- Comment 1 ---
   // If e[i][i] = 0, exchange this row with another below it (say
   // the k-th row, k > i) such that e[i][k] != 0. If no such k is
   // found, exit with the message that the matrix e is singular.
   // The code to do this is not shown here.
   for (j = i+1; j < n; j++) {
      for (k = i+1; k < n; k++) {
         // Multiply i-th row with e[j][i].
         // Multiply j-th row with e[i][i].
         // Subtract i-th row from j-th row.
         e[j][k] = e[j][k]*e[i][i] − e[i][k]*e[j][i];
      }
      b[j] = b[j]*e[i][i] − b[i]*e[j][i];
   }
   // Zero lower triangle coefficients
   for (k = 0; k < i; k++) e[i][k] = 0;
}
// Back-substitute.
i = n;
// At the end of the following while loop, e[i−1][i−1] will
// contain l_ii
// and b[i−1] will contain r_i. The solution will be x_i = l_ii/ r_i.
while (i−−) {
   j = n;
   while (j−−) b[j] = b[j]*e[i][i] b[i]*e[j][i];
   for(k = 0; k < n; k++) {
      for (j = k; j < n; j++) {
         e[k][j] *= e[i][i];
      }
   }
}
```

Now, let system $S_1$ be the set of equations:

$$ax_1+x_2+x_3=a+2$$

$$x_1+x_2+x_3=3$$

$$x_1+x_2x_3=1$$

and let system $S_2$ be the set of equations $$ax_1+2x_2=a+2$$

$$2x_1+2x_2=4$$

$$x_2x_3=0$$

That is, each set consists of three equations.

Considering system $S_1$ first, the may be written as follows:

$$e[0][0]=a$$

$$e[0][1]=1$$

$$e[0][2]=1$$

$$b[0]=a+2$$

$$e[1][0]=1$$

$$e[1][1]=1$$

$$e[1][2]=1$$

$$b[1]=3$$

$$e[2][0]=1$$

$$e[2][1]=1$$

$$e[2][2]=-1$$

$$b[2]=1$$

Performing step 240 in system $S_1$, all the terms in the are converted by the computer program performing method 200 into the reduced form, with the text variable to which a pseudocode variable refers to at different stages of computation noted on the right hand side, as follows:

| Reduced Form | Variables |
| --- | --- |
| e[0][0] = +.10000e + 01*a | $^0e_{11} = e_{11}$ |
| e[0][1] = +.10000e + 01 | $^0e_{12} = e_{12}$ |
| e[0][2] = +.10000e + 01 | $^0e_{13} = e_{13}$ |
| b[0] = +.10000e + 01*a + .20000e + 01 | $^0b_1 = b_1$ |
| e[1][0] = +.10000e + 01 | $^0e_{21} = e_{21}$ |
| e[1][1] = +.10000e + 01 | $^0e_{22} = e_{22}$ |
| e[1][2] = +.10000e + 01 | $^0e_{23} = e_{23}$ |
| b[1] = +.30000e + 01 | $^0b_2 = b_2$ |
| e[2][0] = +.10000e + 01 | $^0e_{31} = e_{31}$ |
| e[2][1] = +.10000e + 01 | $^0e_{32} = e_{32}$ |
| e[2][2] = −.10000e + 01 | $^0e_{33} = e_{33}$ |
| b[2] = +.10000e + 01 | $^0b_3 = b_3$ |

With counter k set to 1 in step 250, a first derived system is found by performing step 252, thereby eliminating the variable $x_1$ from equations 2 and 3. The coefficients $^1e_{ij}$ and the quantities $^1b_i$ of the first derived system are as follows:

| Reduced Form | Variables |
| --- | --- |
| e[0][0] = +.10000e + 01*a | $^0e_{11}$ |
| e[0][1] = +.10000e + 01 | $^0e_{12}$ |
| e[0][2] = +.10000e + 01 | $^0e_{13}$ |
| b[0] = +.10000e + 01*a + .20000e + 01 | $^0b_1$ |
| e[1][0] = +.00000e + 00 | $^1e_{21}$ |
| e[1][1] = −.10000e + 01 + .10000e + 01*a | $^1e_{22}$ |
| e[1][2] = −.10000e + 01 + .10000e + 01*a | $^1e_{23}$ |
| b[1] = −.20000e + 01 + .20000e + 01*a | $^1b_2$ |
| e[2][0] = +.00000e + 00 | $^1e_{31}$ |
| e[2][1] = −.10000e + 01 + .10000e + 01*a | $^1e_{32}$ |
| e[2][2] = −.10000e + 01 − .10000e + 01*a | $^1e_{33}$ |
| b[2] = −.20000e + 01 | $^1b_3$ |

The above first derived system for system $S_1$, when written in normal algebraic form, appears as:

$$ax_1+x_2+x_3=a+2$$

$$(a1)x_2+(a1)x_3=2(a-1)$$

$$(a1)x_2(a+1)x_3=-2$$

By repeating steps 250 to 260, the method 200 calculates the second derived system for system $S_1$ as follows:

| Reduced Form | Variables |
| --- | --- |
| e[0][0] = +.10000e + 01*a | $^0e_{11}$ |
| e[0][1] = +.10000e + 01 | $^0e_{12}$ |
| e[0][2] = +.10000e + 01 | $^0e_{13}$ |
| b[0] = +.10000e + 01*a + .20000e + 01 | $^0b_1$ |
| e[1][0] = +.00000e + 00 | $^1e_{21}$ |
| e[1][1] = −.10000e + 01 + .10000e + 01*a | $^1e_{22}$ |
| e[1][2] = −.10000e + 01 + .10000e + 01*a | $^1e_{23}$ |
| b[1] = −.20000e + 01 + .20000e + 01*a | $^1b_2$ |
| e[2][0] = +.00000e + 00 | $^2e_{31}$ |
| e[2][1] = +.00000e + 00 | $^2e_{32}$ |
| e[2][2] = +.20000e + 01 − .20000e + 01*a*a | $^2e_{33} = l_{33}$ |
| b[2] = +2.0000e + 00*a − 2.0000e + 00*a*a | $^2b_3 = r_3$ | or alternatively $$ax_1+x_2+x_3=a+2$$

$$(a1)x_2+(a1)x_3=2(a1)$$

$$-2a(a1)x_3=-2a(a1)$$

Performing the back substitution step 280 the numerators $r_i$ and the denominators $l_{ii}$ can be found. In particular, from the last equation of the second derived system the numerator $r_3$ and the denominator $l_{33}$ are as follows:

$$l_{33}=-2a(a1) \text{ and } r_3=-2a(a1).$$

Substituting numerator $r_3$ and denominator $l_{33}$ into the second equation, we get:

| Reduced Form | Variables |
| --- | --- |
| e[1][1] = −.20000e + 01*a + .40000e + 01*a*a − .20000e + 01*a*a*a | $l_{22}$ |
| b[1] = −.20000e + 01*a + .40000e + 01*a*a − .20000e + 01*a*a*a | $r_2$ | or $$l_{22}=-2a(1\ 2a+a^2) \text{ and } r_2=-2a(1\ 2a+a^2).$$

In the final back substitution we get

| Reduced Form | Variables |
| --- | --- |
| e[0][0] = −.40000e + 01*a*a + .12000e + 02*a*a*a − .12000e + 02*a*a*a*a + .40000e + 01*a*a*a*a*a | $l_{11}$ |
| b[0] = −.40000e + 01*a*a + .12000e + 02*a*a*a − .12000e + 02*a*a*a*a + .40000e + 01*a*a*a*a*a | $r_1$ | producing thereby $$l_{11}=-4a^3(1\ 3a+3a^2a^3) \text{ and } r_1=-4a^3(1\ 3a+3a^2a^3).$$

In a similar manner, the first derived system of system $S_2$ may be written as follows:

| Reduced Form | Variables |
| --- | --- |
| e[0][0] = +.10000e + 01*a | $^0e_{11}$ |
| e[0][1] = +.20000e + 01 | $^0e_{12}$ |
| e[0][2] = +.00000e + 00 | $^0e_{13}$ |
| b[0] = +.10000e + 01*a + .20000e + 01 | $^0b_1$ |
| e[1][0] = +.00000e + 00 | $^1e_{21}$ |
| e[1][1] = −.40000e + 01 + .20000e + 01*a | $^1e_{22}$ |
| e[1][2] = +.00000e + 00 | $^1e_{23}$ |
| b[1] = −.40000e + 01 + .20000e + 01*a | $^1b_2$ |
| e[2][0] = +.00000e + 00 | $^1e_{31}$ |
| e[2][1] = +.10000e + 01*a | $^1e_{32}$ |
| e[2][2] = −.10000e + 01*a | $^1e_{33}$ |
| b[2] = +.00000e + 00 | $^1b_3$ | or $$ax_1+2x_2=a+2$$

$$2(a2)x_2=2(a2)$$

$$ax_2ax_3=0$$

The second derived system for system $S_2$ is as follows:

| Reduced Form | Variables |
| --- | --- |
| e[0][0] = +.10000e + 01*a | $^0e_{11}$ |
| e[0][1] = +.20000e + 01 | $^0e_{12}$ |
| e[0][2] = +.00000e + 00 | $^0e_{13}$ |
| b[0] = +.10000e + 01*a + .20000e + 01 | $^0b_1$ |
| e[1][0] = +.00000e + 00 | $^1e_{21}$ |
| e[1][1] = −.40000e + 01 + .20000e + 01*a | $^1e_{22}$ |
| e[1][2] = +.00000e + 00 | $^1e_{23}$ |
| b[1] = −.40000e + 01 + .20000e + 01*a | $^1b_2$ |
| e[2][0] = +.00000e + 00 | $^2e_{31}$ |
| e[2][1] = +.10000e + 01*a | $^2e_{32}$ |
| e[2][2] = +.40000e + 01*a − .20000e + 01*a*a | $^2e_{33} = l_{33}$ |
| b[2] = +.40000e + 01*a − .20000e + 01*a*a | $^2b_3 = r_3$ | or $$ax_1+2x_2=a+2$$

$$2(a2)x_2=2(a2)$$

$$2a(2a)x_3=2a(2a)$$

Again performing the back substitution step 280 with system $S_2$ the numerators $r_i$ is and the denominators $l_{ii}$ can be found. The numerator $r_3$ and the denominator $l_{33}$ are as follows:

$$l_{33}=2a(2a) \text{ and } r_3=2a(2a).$$

Substituting numerator $r_3$ and denominator $l_{33}$ into the second equation, we get:

| Reduced Form | Variables |
| --- | --- |
| e[1][1] = −.16000e + 02*a + .16000e + 02*a*a − .40000e + 01*a*a*a | $l_{22}$ |
| b[1] = −.16000e + 02*a + .16000e + 02*a*a − .40000e + 01*a*a*a | $r_2$ | or $$l_{22} = -4a(4-4a+a^2) \text{ and } r_2 = -4a(4-4a+a^2).$$

In the final back substitution we get

| Reduced Form | Variables |
| --- | --- |
| e[0][0] = −.64000e + 02*a*a*a + .96000e + 02*a*a*a*a − .48000e + 02*a*a*a*a*a + .80000e + 01*a*a*a*a*a*a | $l_{11}$ |
| b[0] = −.64000e + 02*a*a*a + .96000e + 02*a*a*a*a − .48000e + 02*a*a*a*a*a + .80000e + 01*a*a*a*a*a*a | $r_1$ | or $$l_{11} = -8a^3(8\ 12a + 6a^2a^3) \text{ and } r_1 = -8a^3(8\ 12a + 6a^2a^3).$$

Performing step 290, the expressions $(l_{ii})_1 * (r_i)_2$ and $(l_{ii})_2 * (r_i)_1$ are calculated and reduced to their reduced forms. For example, calculating $(l_{22})_1 * (r_2)_2$ gives the following:

$$(l_{22})_1 * (r_2)_2 = (-.20000e + 01 * a + .40000e +$$
$$01 * a * a - .20000e + 01 * a * a * a) *$$
$$(-.16000e + 02 * a + .16000e + 02 *$$
$$a * a - .40000e + 01 * a * a * a)$$
$$= +.32000e + 02 * a * a - .32000e + 02 *$$
$$a * a * a + .80000e + 01 * a * a * a * a -$$
$$.64000e + 02 * a * a * a + .64000e + 02 *$$
$$a * a * a * a - .16000e + 02 * a * a * a * a * a +$$
$$.32000e + 02 * a * a * a * a - .32000e + 02 *$$
$$a * a * a * a * a + .80000e + 01 * a * a * a * a * a * a$$
$$= +.32000e + 02 * a * a - .96000e + 02 * a * a * a +$$
$$.10400e + 03 * a * a * a * a -$$
$$.48000e + 02 * a * a * a * a * a + .80000e + 01 *$$
$$a * a * a * a * a * a$$

Similarly, calculating $(l_{22})_2 * (r_2)_1$ gives the following:

$$(l_{22})_2 * (r_2)_1 = (-.16000e + 02 * a + .16000e +$$
$$02 * a * a - .40000e + 01 * a * a * a) *$$
$$(-.20000e + 01 * a + .40000e +$$
$$01 * a * a - .20000e + 01 * a * a * a)$$
$$= +.32000e + 02 * a * a - .64000e +$$
$$02 * a * a * a + .32000e + 02 * a * a * a * a -$$
$$.32000e + 02 * a * a * a * a + .64000e + 02 *$$
$$a * a * a * a - .32000e + 02 * a * a * a * a * a +$$
$$.80000e + 01 * a * a * a * a - .16000e + 02 *$$
$$a * a * a * a * a + .80000e + 01 * a * a * a * a * a * a$$
$$= +.32000e + 02 * a * a - .96000e + 02 * a * a * a +$$
$$.10400e + 03 * a * a * a * a -$$

-continued
$$.48000e + 02 * a * a * a * a * a + .80000e + 01 *$$
$$a * a * a * a * a * a$$

Step 290 similarly calculates the expressions $(l_{ii})_1 * (r_i)_2$ and $(l_{ii})_2 * (r_i)_1$ for i=1 and i=3. A simple string comparison of $(l_{22})_1 * (r_2)_2$ with $(l_{22})_2 * (r_2)_1$, performed in step 300, shows that these expressions match. By repeating the comparison of $(l_{ii})_1 * (r_i)_2$ with $(l_{ii})_2 * (r_i)_1$ for i=1 and i=3, and finding that the expressions match for each i=1, 2 and 3, it can be shown that system $S_1$ is equivalent to system $S_2$.

Embodiments of the invention can be implemented within compilers, for example. As is well known, a compiler generates machine executable object code from high-level source code, written in languages such as C++.

The foregoing describes only some embodiments of the present invention, and modifications and/or changes can be made thereto without departing from the scope and spirit of the invention, the embodiments being illustrative and not restrictive. For example, the equivalence of more than two sets of simultaneous linear algebraic equations may be determined by pair-wise comparing the sets for equivalence.

I claim:

1. A computer implemented method in a simulation of a physical system, wherein the system is described by a first set of n simultaneous linear algebraic equations and is simulated by a second system described by a second set of n simultaneous linear algebraic equations, each of said equations being of a form:

$$e_{i1}x_1 + e_{i2}x_2 + e_{i3}x_3 + \ldots + e_{in}x_n = b_i$$

wherein $x_j$ are n unknowns, $e_{ij}$ are n coefficients for each of the n equations of each set, and $b_i$ are n quantities, said coefficients and quantities being known algebraic expressions, said method comprising the steps of:

a) providing respective reduced sets, wherein step a) includes the following substeps for each of the equations of each of the sets:

a1) arranging variables in the coefficients $e_{ij}$ and the quantities $b_i$ as multiplied instances of the variables;

a2) arranging expressions resulting from substep a1) into a form <unitaryoperation><operand><operator><operand> ... <operator><operand>, wherein the unitary operation is either + or −, and each operator is one of: +, −, or *, and wherein the substep a2) includes inserting the unitary operation in front of an expression if the expression does not already commence with the unitary operator;

a3) eliminating terms resulting from substep a2);

a4) substituting, in expressions resulting from substep a3), all + operators with a string +1* and all − operators with a string −1*;

a5) converting numerical terms resulting from substep a4) into an exponential format; and a6) sorting operands of terms resulting from substep a5); and b) combining and rearranging terms resulting from substeps a1) through a6) to eliminate said unknowns from each of said sets of simultaneous linear algebraic equations and to provide for each set, n equations in a form:

$$(l_{ii})_k x_i = (r_i)_k$$

wherein $l_{ii}$ and $r_i$ are algebraic expressions, i={1 through n}, k=1 indicates the first one of said sets and k=2 indicates the second one of said sets; and c) comparing, using a processor, for each of said unknowns, a first product $(l_{ii})_1 * (r_i)_2$ and a second product $(l_{ii})_2 * (r_i)_1$, wherein the first product is an algebraic expression and the second product is an algebraic expression, and wherein if said products match for all said unknowns said second set of simultaneous linear algebraic equations is equivalent to the first set of simultaneous linear algebraic equations and thereby is determined to be a proper representation of the physical system, wherein the eliminating said unknowns in step a) enables the comparing in step c) to determine if the products match without determining numerical values for the unknowns and without performing a matrix inversion.

2. The computer implemented method according to claim 1, wherein certain variables in the coefficients $e_{ij}$ and the quantities $b_i$ of such an equation are raised to a positive integer power, and wherein in a1) each instance of such a variable is raised to a power of 1.

3. The method according to claim 1, wherein a3) includes:
multiplying terms inside and outside brackets to render certain ones of the brackets superfluous; and
discarding the superfluous brackets.

4. The method according to claim 1, wherein in a5) the exponential format includes, [unsigned number]e[e-sign] [unsigned exponent], wherein e[e-sign] [unsigned exponent] for a numerical term represents a quantity 10 raised to a power [e-sign] [unsigned exponent] multiplied by a number represented by, [unsigned number], such that, [unsigned number] e[e-sign] [unsigned exponent] equals the numerical term, [unsigned number] being an n-digited number comprising only digits, n being a prefixed integer greater than 0, [e-sign] being a sign of the exponent, [unsigned exponent] being an m-digited number, and m being a prefixed integer greater than 0.

5. The method according to claim 1, wherein in a6) the sorting of the operands arranges the operands into ascending order according to a certain standardized value sequence.

6. The method according to claim 1, wherein in b) the combining of such terms includes combining ones of the terms having matching variable-groups into a single term.

7. The method according to claim 6, wherein in b) the rearranging of such terms includes arranging ones of the terms into an ascending order according to values of their respective variable-groups.

8. An apparatus comprising:
a processor;
a storage device connected to the processor, wherein the storage device has computer readable program code for controlling the processor, and wherein the processor is operative with the program code for simulating a physical system, wherein the system is described by a first set of n simultaneous linear algebraic equations and is simulated by a second system described by a second set of n simultaneous linear algebraic equations, each of said equations being of a form:

$$e_{i1}x_1 + e_{i2}x_2 + e_{i3}x_3 + \ldots + e_{in}x_n = b_i$$

wherein $x_j$ are n unknowns, $e_{ij}$ are n coefficients for each of the n equations of each set, and $b_i$ are n quantities, said coefficients and quantities being known algebraic expressions, the program code comprising:
instructions for performing a step a) of providing respective reduced sets, wherein the instructions include:

instructions for performing a substep a1) of arranging variables in the coefficients $e_{ij}$ and the quantities $b_i$ in a form having multiplied instances of the variables;
instructions for performing a substep a2) of arranging expressions resulting from substep a1) into a form <unitaryoperation><operand><operator>< operand>...<operator><operand>, wherein the unitary operation is either + or −, and each operator is one of: +, −, or *, and wherein the substep a2) includes inserting the unitary operation in front of an expression if the expression does not already commence with the unitary operator;
instructions for performing a substep a3) of eliminating terms resulting from substep a2);
instructions for performing a substep a4) of substituting, in expressions resulting from substep a3), all + operators with a string +1* and all − operators with a string −1*;
instructions for performing a substep a4) of substituting, in expressions resulting from substep a3), all + operators with a string +1* and all − operators with a string −1*;
instructions for performing a substep a5) of converting numerical terms resulting from substep a4) into an exponential format; and
instructions for performing a substep a6) of sorting operands of terms resulting from substep a5); and
instructions for performing a step b) of combining and rearranging terms resulting from substeps a1) through a6) to eliminate said unknowns from each of said sets of simultaneous linear algebraic equations and to provide for each set, n equations in a form:

$$(l_{ii})_k x_i = (r_i)_k$$

wherein $l_{ii}$ and $r_i$ are algebraic expressions, i={1 through n}, and k=1 indicates the first one of said sets and k=2 indicates the second one of said sets; and
instructions for performing a step c) of comparing, for each of said unknowns, a first product $(l_{ii})_1 * (r_i)_2$ and a second product $(l_{ii})_2 * (r_i)_1$, wherein the first product is an algebraic expression and the second product is an algebraic expression, and wherein if said products match for all said unknowns said second set of simultaneous linear algebraic equations is equivalent to the first set of simultaneous linear algebraic equations and thereby is determined to be a proper representation of the physical system, wherein the eliminating said unknowns in step a) enables the comparing in step c) to determine if the products match without determining numerical values for the unknowns and without performing a matrix inversion.

9. The apparatus according to claim 8, wherein certain variables in the coefficients $e_{ij}$ and the quantities $b_i$ of such an equation are raised to a positive integer power, and wherein in a1) each instance of such a variable is raised to a power of 1.

10. The apparatus according to claim 8, wherein a3) includes:
multiplying terms inside and outside brackets to render certain ones of the brackets superfluous; and
discarding the superfluous brackets.

11. The apparatus according to claim 8, wherein in a5) the exponential format includes, [unsigned number]e[e-sign] [unsigned exponent], wherein e[e-sign] [unsigned exponent] for a numerical term represents a quantity 10 raised to a power [e-sign] [unsigned exponent] multiplied by a number represented by, [unsigned number], such that, [unsigned number] e[e-sign] [unsigned exponent] equals the numerical term,

[unsigned number] being an n-digited number comprising only digits, n being a prefixed integer greater than 0, [e-sign] being a sign of the exponent, [unsigned exponent] being an m-digited number, and m being a prefixed integer greater than 0.

12. The apparatus according to claim 8, wherein in a6) the sorting of the operands arranges the operands into ascending order according to a certain standardized value sequence.

13. The apparatus according to claim 8, wherein in b) the combining of such terms includes combining ones of the terms having matching variable-groups into a single term, and in b) the rearranging of such terms includes arranging ones of the terms into an ascending order according to values of their respective variable-groups.

14. A computer program product for use in a simulation of a physical system, wherein the system is described by a first set of n simultaneous linear algebraic equations and is simulated by a second system described by a second set of n simultaneous linear algebraic equations, each of said equations being of a form:

$$e_{i1}x_1 + e_{i2}x_2 + e_{i3}x_3 + \ldots + e_{in}x_n = b_i$$

wherein $x_j$ are n unknowns, $e_{ij}$ are n coefficients for each of the n equations of each set, and $b_i$ are n quantities, said coefficients and quantities being known algebraic expressions, the computer program product residing on a computer readable storage medium having computer readable program code, the program code comprising:
- instructions for performing a step a) of providing respective reduced sets, wherein the instructions include:
- instructions for performing a substep a1) of arranging variables in the coefficients $e_{ij}$ and the quantities $b_i$ in a form having multiplied instances of the variables;
  - instructions for performing a substep a1) of arranging variables in the coefficients $e_{ij}$ and the quantities $b_i$ in a form having multiplied instances of the variables;
  - instructions for performing a substep a2) of arranging expressions resulting from substep a1) into a form <unitaryoperation><operand><operator><operand> ... <operator><operand> wherein the unitary operation is either + or −, and each operator is one of: +, −, or *, and wherein the substep a2) includes inserting the unitary operation in front of an expression if the expression does not already commence with the unitary operator;
  - instructions for performing a substep a3) of eliminating terms resulting from substep a2);
  - instructions for performing a substep a4) of substituting, in expressions resulting from substep a3), all + operators with a string +1* and all − operators with a string −1*;
  - instructions for performing a substep a5) of converting numerical terms resulting from substep a4) into an exponential format; and
  - instructions for performing a substep a6) of sorting operands of terms resulting from substep a5); and
- instructions for performing a step b) of combining and rearranging terms resulting from substeps a1) through a6) to eliminate said unknowns from each of said sets of simultaneous linear algebraic equations and to provide for each set, n equations in a form:

$$(l_{ii})_k x_i = (r_i)_k$$

wherein $(l_{ii})$ and $r_i$ are algebraic expressions, i={1 through n}, k=1 indicates the first one of said sets and k=2 indicates the second one of said sets; and instructions for performing a step c) of comparing, using a processor, for each of said unknowns, a first product $(l_{ii})_1 * (r_i)_2$ and a second product $(l_{ii})_2 * (r_i)_1$, wherein the first product is an algebraic expression and the second product is an algebraic expression, and wherein if said products match for all said unknowns said second set of simultaneous linear algebraic equations is equivalent to the first set of simultaneous linear algebraic equations and thereby is determined to be a proper representation of the physical system, wherein the eliminating said unknowns in step a) enables the comparing in step c) to determine if the products match without determining numerical values for the unknowns and without performing a matrix inversion.

15. The computer program product according to claim 14, wherein certain variables in the coefficients $e_{ij}$ and the quantities $b_i$ of such an equation are raised to a positive integer power, and wherein in a1) each instance of such a variable is raised to a power of 1.

16. The computer program product according to claim 14, wherein a3) includes:
- multiplying terms inside and outside brackets to render certain ones of the brackets superfluous; and
- discarding the superfluous brackets.

17. The computer program product according to claim 14, wherein in a5) the exponential format includes, [unsigned number]e[e-sign] [unsigned exponent], wherein e[e-sign] [unsigned exponent] for a numerical term represents a quantity 10 raised to a power [e-sign] [unsigned exponent] multiplied by a number represented by, [unsigned number], such that, [unsigned number]e[e-sign] [unsigned exponent] equals the numerical term, [unsigned number] being an n-digited number comprising only digits, n being a prefixed integer greater than 0, [e-sign] being a sign of the exponent, [unsigned exponent] being an m-digited number, and m being a prefixed integer greater than 0.

18. The computer program product according to claim 14, wherein in a6) the sorting of the operands arranges the operands into ascending order according to a certain standardized value sequence.

19. The computer program product according to claim 14, wherein in b) the combining of such terms includes combining ones of the terms having matching variable-groups into a single term.

20. The computer program product according to claim 14, wherein in b) the rearranging of such terms includes arranging ones of the terms into an ascending order according to values of their respective variable-groups.

* * * * *